(12) United States Patent
Kondoh

(10) Patent No.: US 7,123,330 B2
(45) Date of Patent: Oct. 17, 2006

(54) LIQUID CRYSTAL PANEL SUBSTRATE HAVING ALIGNMENT FILM AND METHOD FOR FORMING ALIGNMENT FILM BY VARIED EVAPORATION ANGLE

(75) Inventor: Shinya Kondoh, Nishitokyo (JP)

(73) Assignee: Citizen Watch Co., Ltd., Tokyo (JP)

( * ) Notice: Subject to any disclaimer, the term of this patent is extended or adjusted under 35 U.S.C. 154(b) by 0 days.

(21) Appl. No.: 10/158,068

(22) Filed: May 31, 2002

(65) Prior Publication Data

US 2002/0191137 A1    Dec. 19, 2002

(30) Foreign Application Priority Data

Jun. 1, 2001   (JP)   ............................. 2001-165966
May 27, 2002   (JP)   ............................. 2002-152249

(51) Int. Cl.
  *G02F 1/1337*  (2006.01)
  *G02F 1/141*   (2006.01)
  *C09K 19/02*   (2006.01)

(52) U.S. Cl. .................. 349/125; 349/129; 349/134; 349/173

(58) Field of Classification Search ................ 349/123, 349/124, 125, 129, 130, 173, 134
See application file for complete search history.

(56) References Cited

U.S. PATENT DOCUMENTS 5,227,904 A * 7/1993 Nakanowatari ............. 349/172
5,576,863 A * 11/1996 Aoki et al. .................. 349/124
5,654,784 A * 8/1997 Yasuda et al. ............... 349/172
5,784,141 A * 7/1998 Chen et al. .................. 349/191
5,790,218 A   8/1998 Koden et al. .................. 349/92
5,909,265 A * 6/1999 Kim et al. ................... 349/129
5,917,570 A * 6/1999 Bryan-Brown et al. ..... 349/129
5,936,690 A   8/1999 Koden et al. ............... 349/124
6,141,074 A * 10/2000 Bos et al. .................... 349/129
6,426,786 B1 * 7/2002 Lu et al. ...................... 349/125

FOREIGN PATENT DOCUMENTS

JP        06324338     11/1994
JP        08211366      8/1996
JP       2001215516     8/2001

* cited by examiner

*Primary Examiner*—Andrew Schechter
*Assistant Examiner*—Michael H. Caley
(74) *Attorney, Agent, or Firm*—Finnegan, Henderson, Farabow, Garrett & Dunner, L.L.P.

(57) ABSTRACT

A substrate for a liquid crystal panel having an alignment film, wherein an evaporated film is formed as the alignment film on the substrate, and wherein a portion of the evaporated film corresponding to each single pixel is split into a plurality of segments, and the evaporated film is formed with a different evaporation angle on each of the segments. The evaporation angle θ which is different for each of the plurality of segments is set within a range of 80°≦θ≦88° with respect to the layer normal to the substrate, and the plurality of split segments have approximately equal areas.

8 Claims, 9 Drawing Sheets

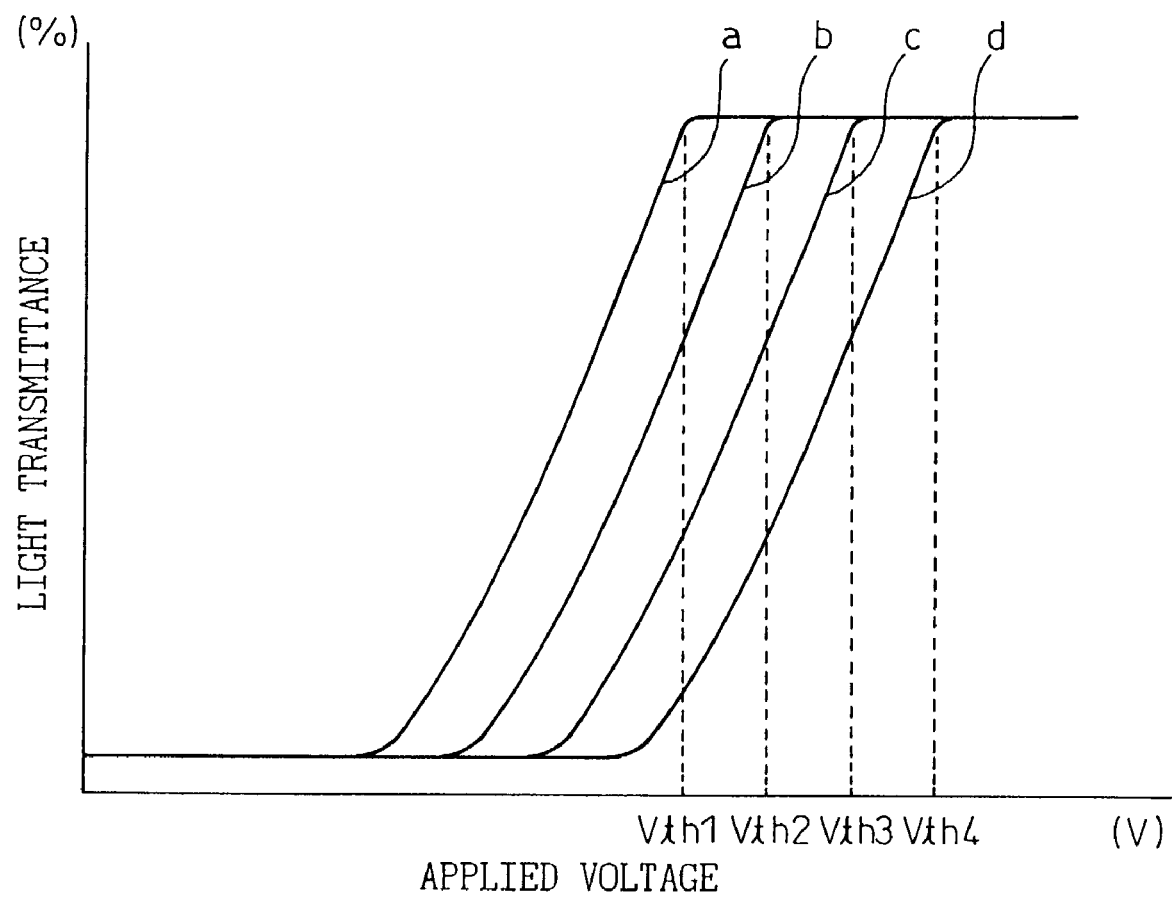

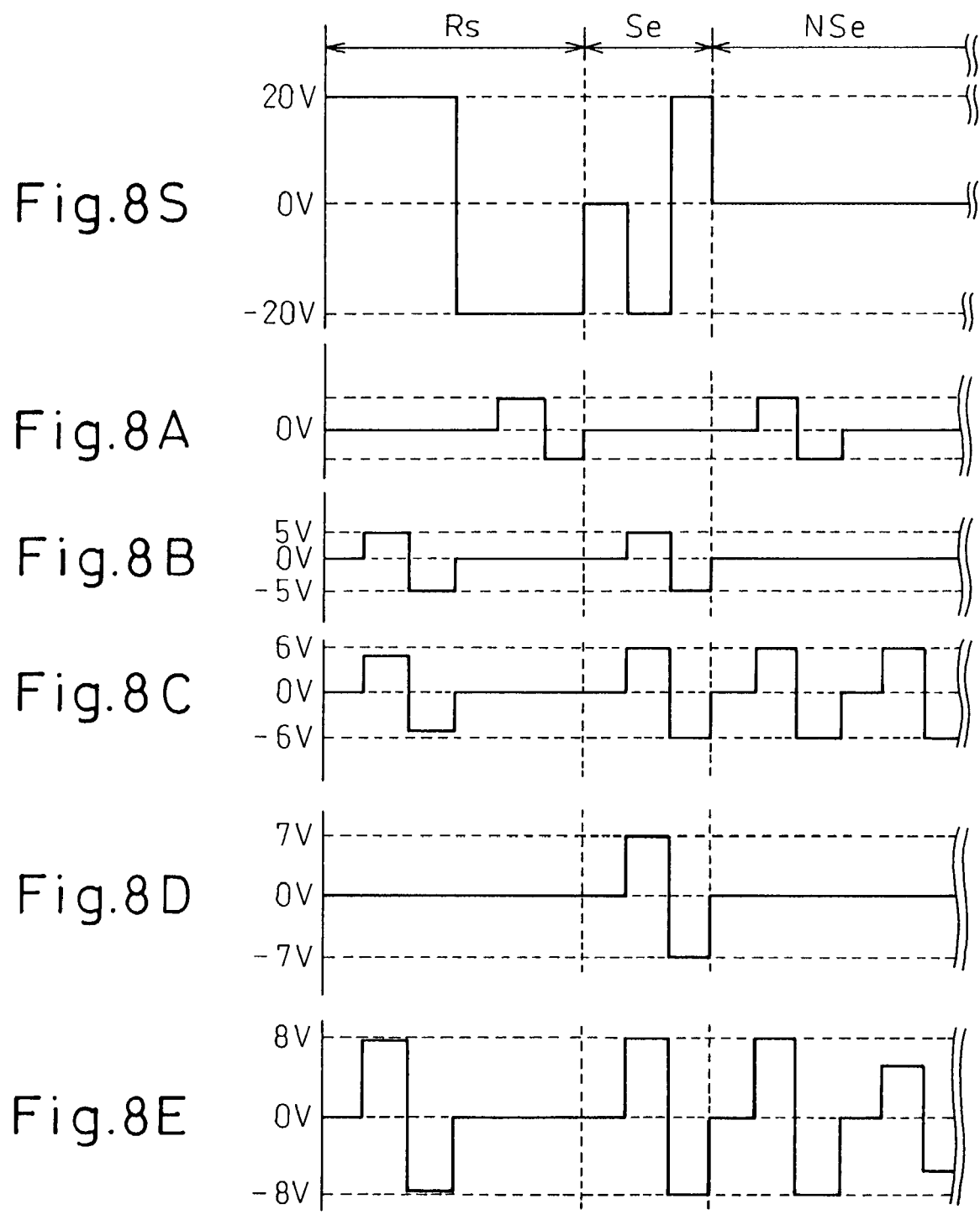

LIQUID CRYSTAL PANEL SUBSTRATE HAVING ALIGNMENT FILM AND METHOD FOR FORMING ALIGNMENT FILM BY VARIED EVAPORATION ANGLE

BACKGROUND OF THE INVENTION

1. Field of the Invention

The present invention relates to a liquid crystal panel and, more specifically, to a liquid crystal panel with substrate having an alignment film, and to a method for driving the liquid crystal panel.

2. Description of the Related Art

It is known that generally, a ferroelectric liquid crystal molecule moves in such a manner as to rotate along the lateral surface of a cone (hereinafter called the "liquid crystal cone") when an external force such as an electric field is applied. In a liquid crystal panel constructed by sandwiching a ferroelectric liquid crystal between a pair of substrates, the ferroelectric liquid crystal is controlled by the polarity of the applied voltage so that the liquid crystal molecules lie in one of two positions on the lateral surface of the liquid crystal cone. These two stable states of the ferroelectric liquid crystal are called the first ferroelectric state and the second ferroelectric state.

FIG. 1 shows one example of the arrangement of polarizers in a ferroelectric liquid crystal panel constructed using a ferroelectric liquid crystal. A liquid crystal cell 22 with the ferroelectric liquid crystal confined therein is placed between the polarizers 11a and 11b whose polarization axes are arranged substantially at right angles to each other (crossed Nicol configuration), with either the polarization axis "a" of the polarizer 11a or the polarization axis "b" of the polarizer 11b oriented so as to coincide with the long axis direction of the ferroelectric liquid crystal molecules when the molecules are in the first or the second ferroelectric state when no voltage is applied. In the example of FIG. 1, the polarizers are arranged with the polarization axis "a" oriented so as to coincide with the long axis direction of the ferroelectric liquid crystal molecules in the second ferroelectric state.

When the polarizers are arranged as shown in FIG. 1, light is not transmitted in the second ferroelectric state, and the ferroelectric liquid crystal panel therefore produces a black display (non-transmissive state). Depending on the polarity of the applied voltage, the ferroelectric liquid crystal is switched to the first ferroelectric state, causing the ferroelectric liquid crystal molecules to tilt at a certain angle relative to the polarization axis, so that light from a backlight is transmitted therethrough and a white display is thus produced (transmissive state). In the illustrated example, the polarizers are arranged with the polarization axis "a" oriented so as to coincide with the long axis direction of the liquid crystal molecules in the second ferroelectric state but, alternatively, the polarizers may be arranged so that the direction of the polarization axis "a" coincides with the long axis direction of the liquid crystal molecules in the first ferroelectric state. In that case, the display appears black (non-transmissive state) in the first ferroelectric state, and white (transmissive state) in the second ferroelectric state. Either arrangement can be employed in the present invention but, the following description is given by taking as an example the case where the arrangement shown FIG. 1 is employed.

FIG. 2 shows the relationship between the value of the voltage applied to the ferroelectric liquid crystal panel and the light transmittance of the ferroelectric liquid crystal panel. As shown in FIG. 2, when a positive voltage equal to or greater in magnitude than a certain value is applied to the ferroelectric liquid crystal, the ferroelectric liquid crystal exhibits the first ferroelectric state, allowing light to transmit through the ferroelectric liquid crystal panel when the polarizers are arranged as shown in FIG. 1. Conversely, when a negative voltage equal to or greater in magnitude than a certain value is applied, the ferroelectric liquid crystal exhibits the second ferroelectric state, the state in which no light is transmitted. As can be seen from the figure, the light transmittance of the ferroelectric liquid crystal is maintained even when the applied voltage becomes 0 V. That is, the display state, once written, is retained even after the applied voltage is removed.

FIG. 3 shows a typical driving method for the ferroelectric liquid crystal panel having the polarizer arrangement shown in FIG. 1. FIG. 3D shows how the amount of light (light transmittance) transmitted through one pixel in the ferroelectric liquid crystal panel varies with the applied voltage. The period ON (W) corresponds to the state that allows light transmission, and thus the pixel is in a white display state. The period OFF (B) corresponds to the state that blocks light transmission, and thus the pixel is in a black display state. Scanning electrodes and signal electrodes are formed on the opposing substrates of the liquid crystal panel, and the pixel located at each intersection of the scanning electrodes and signal electrodes is driven in the white display state or black display state. A composite voltage waveform (FIG. 3C) representing the composition of the scanning voltage waveform 3A applied to a scanning electrode and the signal voltage waveform (FIG. 3B) applied to a signal electrode is applied to the corresponding pixel in the ferroelectric liquid crystal panel.

The driving waveform shown in FIG. 3A has at least one scanning period in order to produce a display based on the first display data, and the scanning period includes a selection period (Se) for selecting the display state based on the display data and a non-selection period (NSe) for holding the selected display state; here, for writing the next display data, a reset period (Rs) for resetting, irrespective of the previously display state, the ferroelectric liquid crystal to one of the ferroelectric states is provided preceding the selection period. In the driving method illustrated by the driving waveform shown in FIG. 3, the ferroelectric liquid crystal is first reset to the first ferroelectric state for a white display state (transmissive state) in the first half of the reset period, and then to the second ferroelectric state for a black display state (non-transmissive state) in the second half of the reset period. In this way, in a ferroelectric liquid crystal display driving method, in order to produce a good display it is generally practiced to provide a reset period for switching the ferroelectric liquid crystal between the first and second ferroelectric states, irrespective of the immediately preceding display state, by applying pulses of opposite polarities.

As a grayscale display method for a ferroelectric liquid crystal panel having only two states, i.e., the first ferroelectric state and the second ferroelectric state, it is practiced to provide a voltage gradient within the same pixel and thus provide different threshold voltages within the same pixel, or to split each one pixel into a plurality of segments and apply a designated voltage to each individual segment, achieving a grayscale display based on the area ratio between the white and black display states within the pixel divided into the plurality of segments.

However, if each one pixel is divided into a plurality of segments, the number of electrodes increases, increasing the complexity of the cell structure; furthermore, since the number of ICs also increases, the cost of the panel rises. On the other hand, two main methods are used to provide a voltage gradient within the same pixel, one being by providing a voltage gradient across an electrode itself and the other by providing numerous recesses and protrusions on the electrode surface, but in either method, it is technically extremely difficult to provide the voltage gradient with good reproducibility.

SUMMARY OF THE INVENTION

In accordance with an aspect of the present invention, there is provided a substrate for a liquid crystal panel having an alignment film, wherein an evaporated film is formed as the alignment film on the substrate, and wherein a portion of the evaporated film corresponding to each single pixel is split into a plurality of segments, and the evaporated film is formed with a different evaporation angle on each of the segments. Since the threshold voltage of the liquid crystal differs depending on the evaporation angle of the evaporated film formed as the alignment film, then, when the portion of the evaporated film corresponding to each single pixel is split into a plurality of segments, and the evaporated film is formed with a different evaporation angle on each of the segments, each pixel can be made to have a plurality of different threshold values. Grayscale display can therefore be achieved by adjusting the voltage applied to each pixel.

The evaporation angle θ which is different for each of the plurality of segments is desirably set within a range of $$80° \leq \theta \leq 88°$$

with respect to the layer normal to the substrate.

Furthermore, when the plurality of split segments are made to have approximately equal areas, the grayscale display state becomes linear with respect to the applied voltage, and a good grayscale display can be produced.

The liquid crystal panel may be constructed as a smectic liquid crystal panel using a smectic liquid crystal. The smectic liquid crystal may be a ferroelectric liquid crystal. The evaporated film may be formed as an $SiO_x$ film.

In a method for forming the alignment film, the substrate is placed above an evaporation source to be evaporated as the alignment film and, by masking the substrate while leaving a portion thereof exposed, evaporation is performed using a prescribed evaporation angle, the evaporation being performed a plurality of times each time by exposing a different portion of the substrate and using a different evaporation angle, thereby forming a plurality of evaporated films with different evaporation angles.

The present invention is effective not only for smectic liquid crystals but also for every other kind of liquid crystal including twisted nematic liquid crystals. Its effectiveness is particularly apparent for smectic liquid crystals or the like having properties easily affected by an alignment state due to the close spacing between the substrates. Among the smectic liquid crystals, the effectiveness of the invention is most apparent for ferroelectric liquid crystals in which it is difficult to achieve a grayscale display.

BRIEF DESCRIPTION OF THE DRAWINGS

FIG. 6 is a diagram showing curves each depicting the variation of light transmittance for a different evaporation angle in the ferroelectric liquid crystal panel according to the present invention.

FIG. 8S and FIGS. 8A to 8E are diagrams showing scanning voltage and signal voltage waveforms according to the present invention.

DETAILED DESCRIPTION OF THE PREFERRED EMBODIMENTS

Embodiments of the present invention will be described in detail below with reference to the accompanying drawings. The following description is given by taking as an example a panel constructed using a ferroelectric liquid crystal, but the present invention is applicable not only to ferroelectric liquid crystals but also to smectic liquid crystals and even to nematic liquid crystals.

Figure 4:
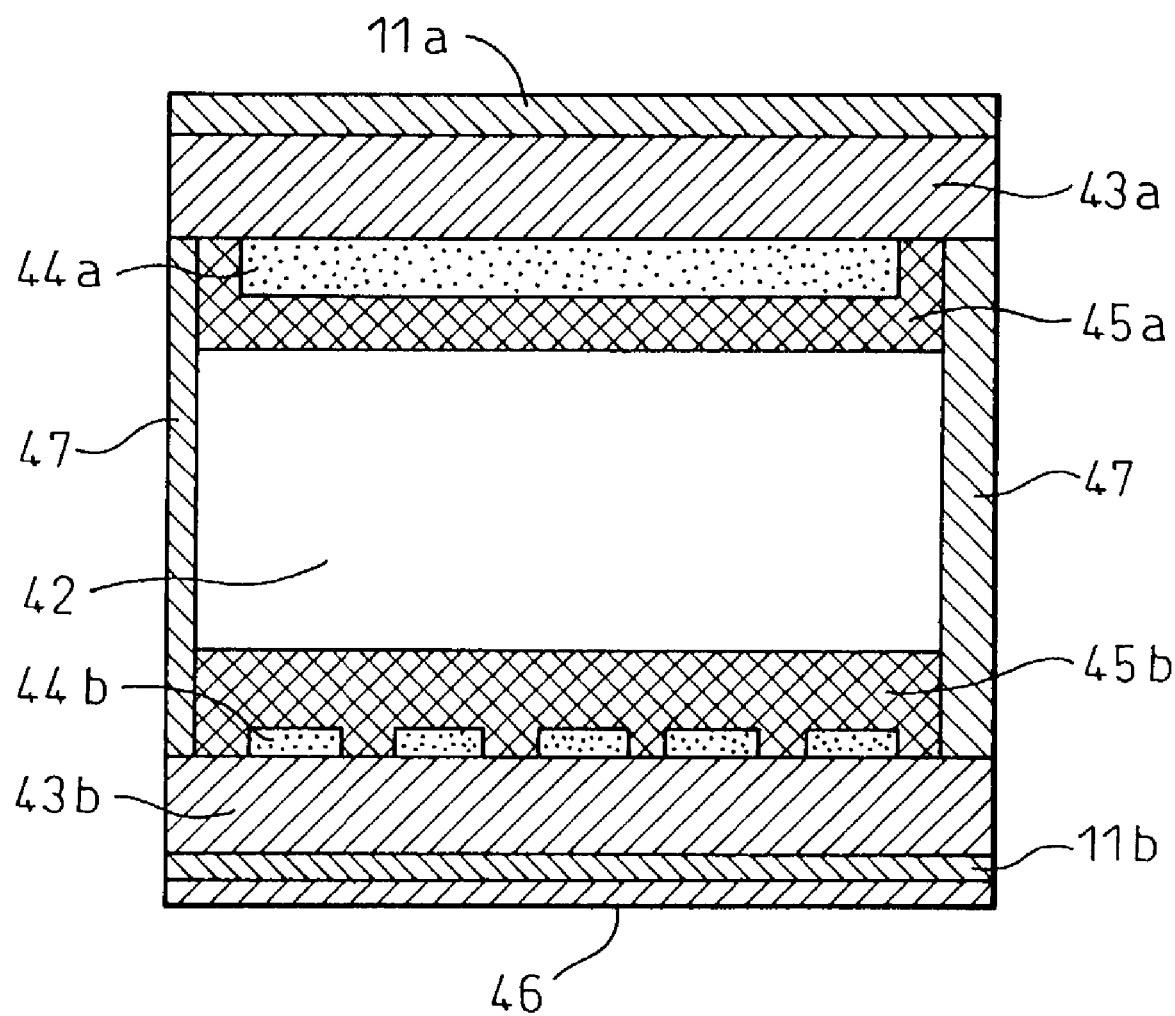
FIG. 4 is a diagram showing the structure of a ferroelectric liquid crystal panel used in the present invention.

FIG. 4 is a diagram showing the structure of a ferroelectric liquid crystal panel used in the present invention. The liquid crystal panel comprises a pair of substrates 43a and 43b of glass or like material holding therebetween a ferroelectric liquid crystal layer 42 of a thickness of about 1.7 μm. On the opposing surfaces of the substrates 43a and 43b are formed electrodes 44a and 44b, over which alignment films 45a and 45b respectively are formed by evaporating $SiO_x$. In the illustrated embodiment, $SiO_x$ is evaporated on both sides, but $SiO_x$ may be evaporated only on one of the substrates and the alignment film on the other substrate may be formed by other means than evaporation. On the outside surface of one substrate 43a is arranged a first polarizer 11a with its polarization axis "a" oriented so as to coincide with the long axis direction of the ferroelectric liquid crystal molecules when the molecules are in the second ferroelectric state when no voltage is applied. On the outside surface of the other substrate 43b, a second polarizer 11b is arranged with its polarization axis "b" oriented at 90° to the polarization axis "a" of the first polarizer 11a.

Figure 5:
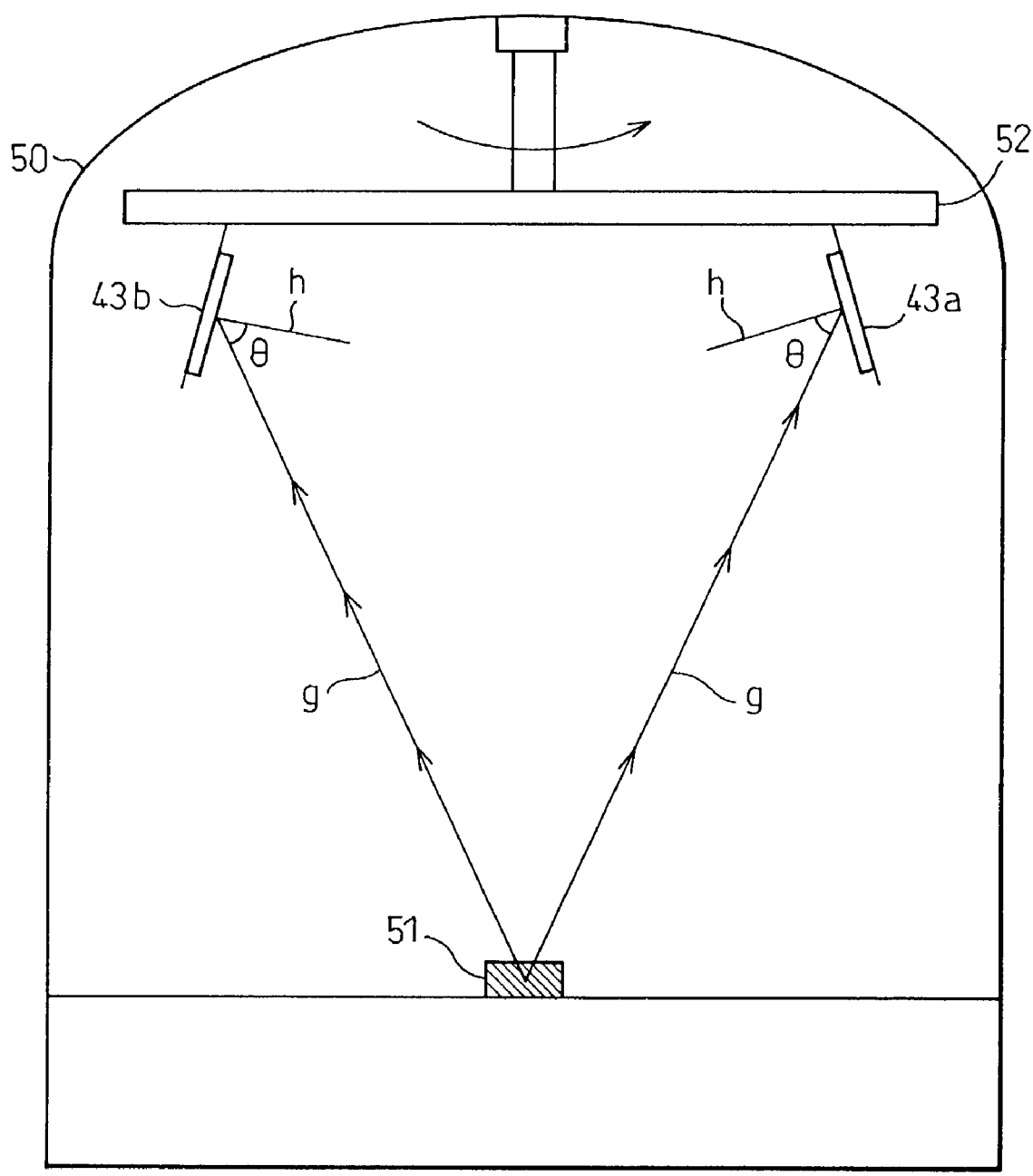
FIG. 5 is a diagram for explaining a method for forming an evaporated film as an alignment film according to the present invention.

FIG. 5 is a diagram for explaining an embodiment of a method for forming $SiO_x$ evaporated films as the alignment films by vacuum evaporation according to the present invention. An $SiO_x$ evaporation source 51 is placed substantially at the center of a chamber 50, and the substrates 43a and 43b are held on a sample holding jig 52 provided in the upper part of the chamber. The substrates 43a and 43b are oriented so that their layer normals h make a prescribed angle with respect to the evaporation source 51. The angle that the line g joining the evaporation source 51 to each substrate 43a, 43b makes with the layer normal h of the substrate 43 is denoted as evaporation angle (θ).

First, with one segment in each pixel on the substrates 43a and 43b left exposed and the other segments masked, a first evaporation is performed with θ=88°. Next, the evaporated film formed by the first run of evaporation is masked while exposing one of the other segments, and a second run of evaporation is performed with θ=86°. In like manner, third and fourth runs of evaporation are performed with θ=84° and θ=82°, respectively, forming evaporated films with four different evaporation angles (88°, 86°, 84°, and 82°) within each pixel. In the illustrated embodiment, evaporated films with different evaporation angles are formed on each of the substrates 43a and 43b. The chamber 50 with the substrates held therein is rotated about its vertical axis at a speed of about 5 rpm during the evaporation.

In the above example, the evaporation angle θ is set to 88°, 86°, 84°, and 82°, respectively; here, if θ were set smaller than 80°, the ferroelectric liquid crystal would not align uniformly, and the threshold voltage would become unstable. On the other hand, if θ were set greater than 88°, the evaporated film would be formed substantially parallel to the substrate and could not align the ferroelectric liquid crystal. Therefore, it is desirable to set the evaporation angle θ within a range of $$80°≤θ≤88°$$

In the above example, the segment to be exposed and the segments to be masked in each pixel are changed for each evaporation, to form evaporated films with different evaporation angles. In an alternative example, on the other hand, in the first evaporation an evaporated film is formed, for example, over the entire surface of each substrate without masking the substrate. Next, the evaporated film is removed from the segment on which an evaporated film is to be formed next with a different evaporation angle, and the remaining portion of the evaporated film is masked; in this condition, the second evaporation is performed by changing the evaporation angle. By repeating this process, evaporated films with different evaporation angles are formed within each pixel.

In this embodiment, the evaporated films are formed on both substrates in such a manner that the evaporated films with the same evaporation angle face each other. Further, the two substrates are arranged facing each other and symmetrically about a plane located at equal distance from the two substrates so that the axes of the evaporated films formed on the substrates are oriented parallel to each other in the evaporation direction. In the example shown in FIG. 5, the substrates are arranged on both sides diagonally above the evaporation source 51. Alternatively, the substrates may be arranged on only one side diagonally above the evaporation source 51, or both substrates or one substrate may be arranged in a position directly above the evaporation source 51.

FIG. 6 is a diagram showing the variation of light transmittance with the applied voltage at different positions when the $SiO_x$ evaporated films having four different evaporation angles within each pixel are formed as the alignment films on the respective substrates. As previously noted, the ferroelectric liquid crystal has threshold values in both the positive and negative regions of the applied voltage, and exhibits hysteresis. FIG. 6 shows the variation in light transmittance only for the case where the applied voltage is increased in the positive region. Curve "a" is for the evaporation angle θ=88°, curve "b" for θ=86°, curve "c" for θ=84°, and curve "d" for θ=82°. As can be seen from the figure, the threshold voltage decreases as the evaporation angle increases, and increases as the evaporation angle decreases. Though not shown here, in the case of a negative voltage also, the threshold voltage likewise decreases in magnitude as the evaporation angle increases, and increases in magnitude as the evaporation angle decreases.

FIG. 7 is a diagram showing the variation of light transmittance with the applied voltage when $SiO_x$ films were evaporated with different evaporation angles within one pixel. A black region in the pixel is in the non-transmissive state, showing a black display state (OFF). The evaporation angle θ is 88° for segment "a", 86° for segment "b", 84° for segment "c", and 82° for segment "d". FIG. 7A shows the display state when a voltage lower than Vth1 shown in FIG. 6 is applied, FIG. 7B shows the display state when voltage Vth1 is applied, FIG. 7C shows the display state when voltage Vth2 is applied, FIG. 7D shows the display state when voltage Vth3 is applied, and FIG. 7E shows the display state when voltage Vth4 is applied. By varying the magnitude of the applied voltage as shown, the ratio of the white display state (ON) to the black display state (OFF) in the same pixel can be varied, and thus a good grayscale display can be achieved over the entire ferroelectric liquid crystal panel. In the example shown in FIGS. 7A to 7E, the segments "a", "b", "c", and "d" have approximately equal areas. Consequently, the grayscale level changes linearly with the applied voltage, and thus the rate of change of grayscale level can be made constant.

In FIG. 7, the pixel is split into four segments, but the number of segments can be selected as appropriate, the only requirement being that each pixel be split into a plurality of segments.

It is known that, generally, the voltage applied to a pixel decreases as the pixel is located farther away from the semiconductor circuit provided to supply the driving voltage to the pixel. That is, the threshold voltage becomes higher for a pixel located farther away from the semiconductor circuit, even if the evaporation angle of the evaporated film is the same. As a result, if an evaporated film having an evaporation angle with a lower threshold voltage is formed within the same pixel in a position farther from the semiconductor circuit, there is concern that a distinct difference in grayscale level may not be produced. It is therefore desirable that the evaporated film having a smaller evaporation angle than the others be formed in the segment located farther from the semiconductor circuit than the other segments within the same pixel so that a high threshold voltage is provided for that segment. In other words, it is desirable that the evaporation films having different evaporation angles be arranged within the pixel by considering the location of the semiconductor circuit in the ferroelectric liquid crystal panel. In the case of FIG. 7, for example, since the segment "d" having the highest threshold voltage is located in the upper left portion of the pixel, it is desirable to place the semiconductor circuit in the right side, the bottom, or the bottom right corner of the liquid crystal panel.

The following describes a driving method when displaying five-level grayscale using the ferroelectric liquid crystal panel of the structure shown in FIG. 4. The segments with different evaporation angles are arranged within each pixel as shown in FIG. 7. The threshold voltages for the respective evaporated films are as shown in FIG. 6. Scanning electrodes are formed on one substrate and signal electrodes on the other substrate, and the composite voltage of the scanning voltage applied to a scanning electrode and the signal voltage applied to a signal electrode is applied to the corresponding pixel.

Figure 1:
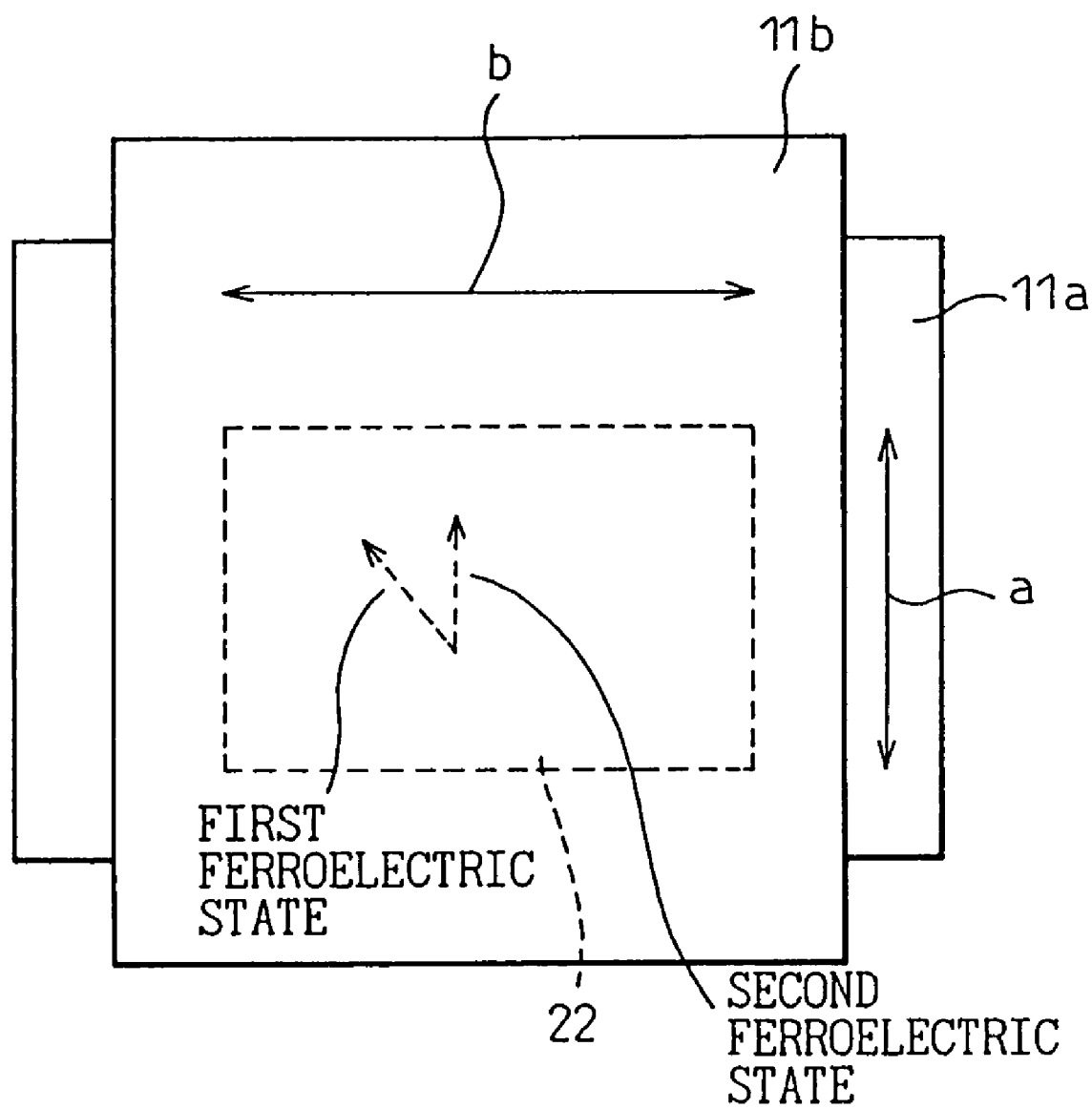
FIG. 1 is a diagram showing the arrangement of polarizers in a ferroelectric liquid crystal panel.
Figure 2:
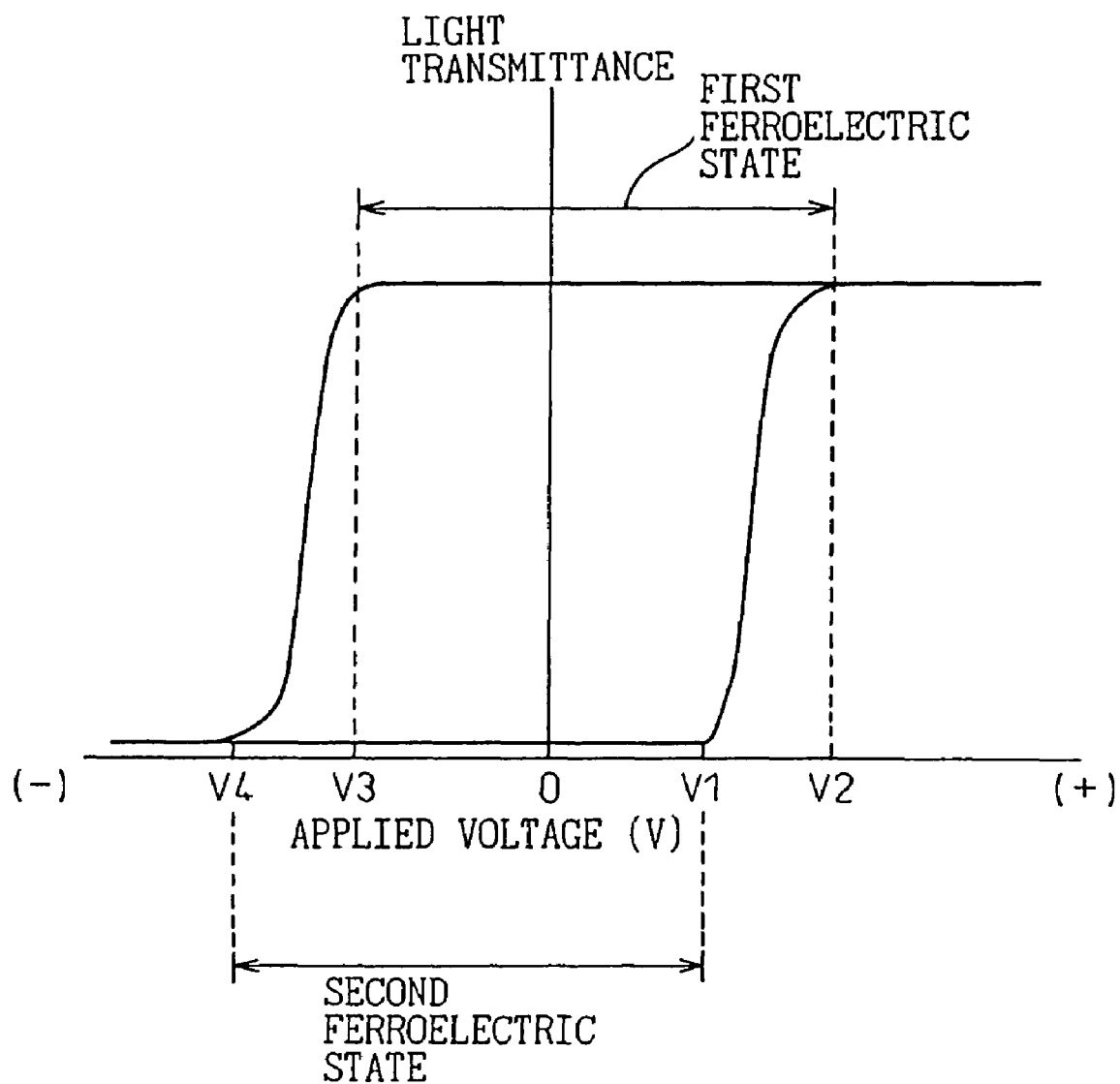
FIG. 2 is a diagram showing curves depicting the variation of light transmittance with an applied voltage in the ferroelectric liquid crystal panel.
Figure 3:
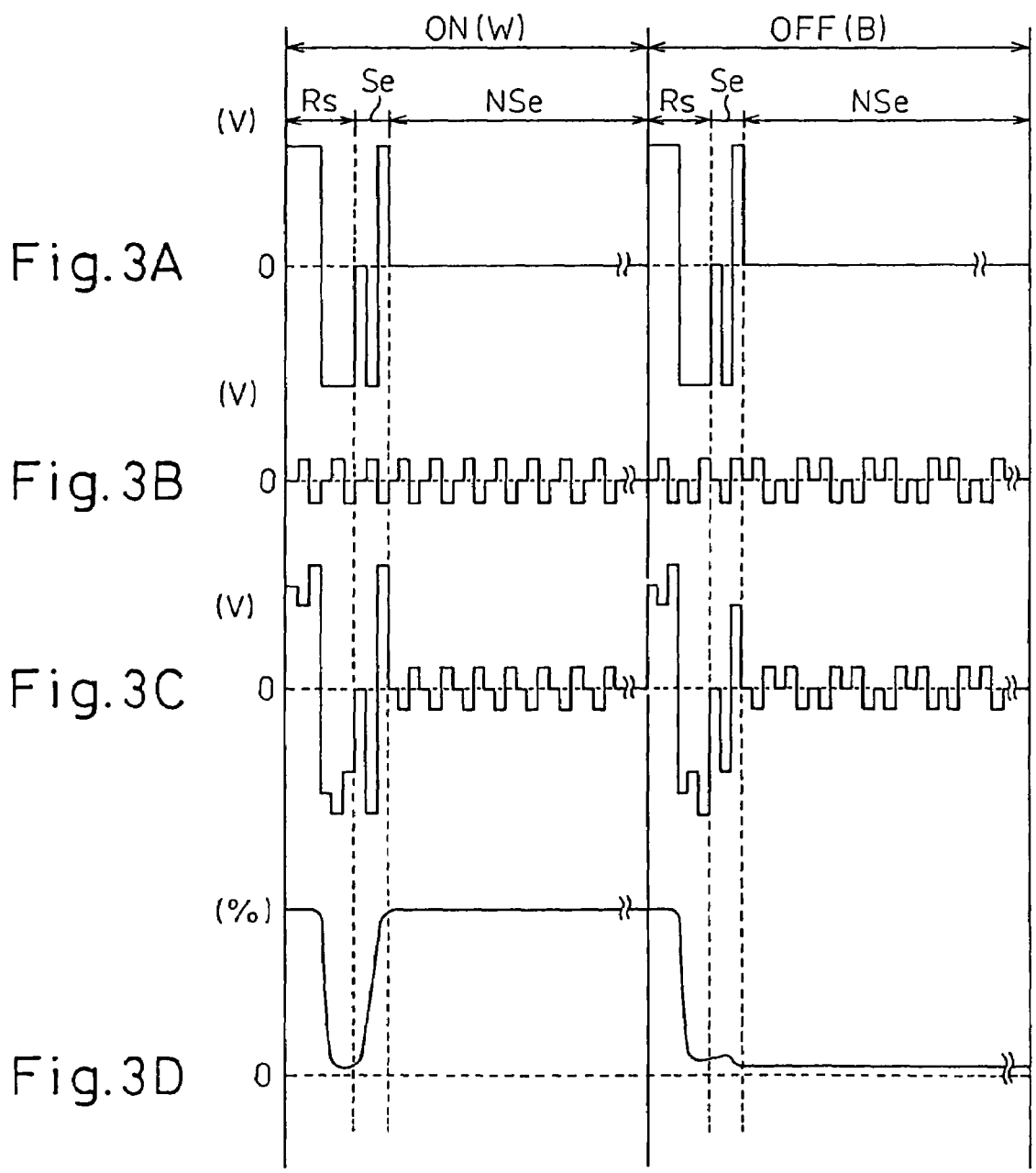
FIGS. 3A to 3C are diagrams showing driving waveforms for a ferroelectric liquid crystal panel according to the prior art.
FIG. 3D is a diagram showing the variation of light transmittance.

FIG. 8S shows the voltage (scanning voltage) waveform applied to the scanning electrode. The scanning voltage waveform applied to the pixel has one scanning period in order to produce a display based on display data for one frame. Each scanning period includes a selection period (Se) for determining the display state based on the display data and a non-selection period (NSe) for holding the display state determined in the selection period (Se). A reset period (Rs) for resetting the liquid crystal to a prescribed state irrespective of the previously display state is provided preceding the selection period. When the polarizers are arranged as shown in FIG. 1, the relationship between the applied voltage and the light transmittance is as shown by the curves in FIG. 2. As shown in FIG. 2, when the applied voltage exceeds the positive threshold value, the liquid crystal is put in the transmissive state, producing a white display. When the applied voltage exceeds the negative threshold value, the liquid crystal is put in the non-transmissive state, producing a black display.

The reset period (Rs) has six phases; the voltage applied to the scanning electrode is 20 V in the first three phases and −20 V in the remaining three phases. In the example shown in FIG. 8A, the final pulse in the reset period the liquid crystal is forcefully reset to the second ferroelectric state to produce a black display irrespective of the display data. The threshold voltages of the ferroelectric liquid crystal used in this embodiment, that is, V2 and V3 shown in FIG. 2, are greater in magnitude than 20 V. Therefore, if 20 V or −20 V is applied for a short period (in the case of FIG. 2, −20 V), the ferroelectric liquid crystal does not make a transition to the second ferroelectric state, and therefore, the display is not put in the black display state. However, when the voltage is applied for a sufficient period as long as three phases, even if the applied voltage is not greater in magnitude than the threshold, the ferroelectric liquid crystal makes a transition to the second ferroelectric state, and the display is put in the black display state. In the selection period (Se) immediately following the reset period, 0 V is applied in the first phase, −20 V is applied in the second phase, and 20 V is applied in the third phase. The voltage applied during the non-selection period (NSe) is 0 V.

FIGS. 8A to 8E each show the voltage (signal voltage) waveform applied to the signal electrode. In the voltage waveforms shown in FIGS. 8A to 8E, the crest value of the voltage applied during the selection period differs depending on the display state. The width of each signal voltage pulse is set to about 35 μs. The voltage waveform applied to the pixel is the composite voltage waveform of the scanning voltage waveform and the signal voltage waveform, and this composite voltage waveform determines the state of the ferroelectric liquid crystal molecules in the pixel.

Figure 7A:
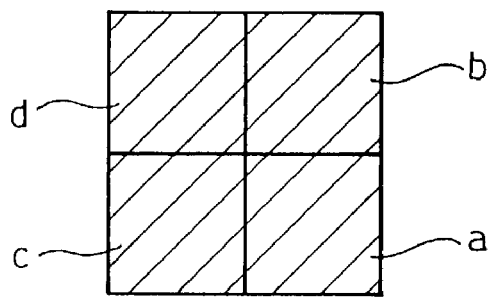
FIGS. 7A to 7E are diagrams showing how a grayscale is achieved within one pixel in the ferroelectric liquid crystal panel according to the present invention.
Figure 9A:
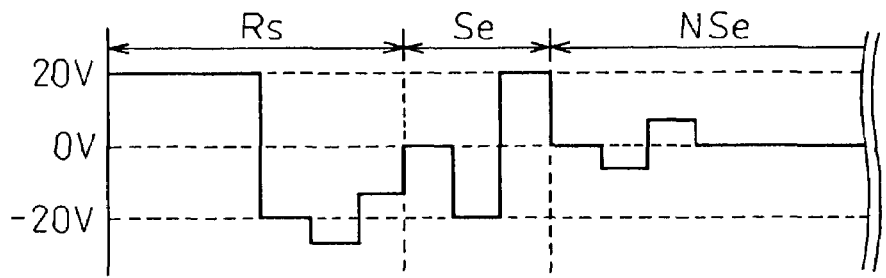
FIGS. 9A to 9E are diagrams showing composite voltage waveforms according to the present invention.

For the display data that displays the entire pixel in the black display state as shown in FIG. 7A, the signal voltage to be applied during the selection period is set to 0 V, as shown in FIG. 8A. The composite voltage waveform of the scanning voltage and the signal voltage of FIG. 8A is as shown in FIG. 9A. The pixel forced into the black display state in the reset period is supplied with 0 V in the first phase of the selection period, −20 V in the second phase, and 20 V in the third phase, but since the threshold voltage is not exceeded, the pixel remains in the black display state.

Figure 7B:
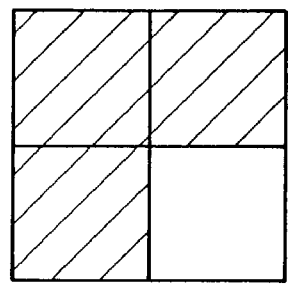
Figure 9B:
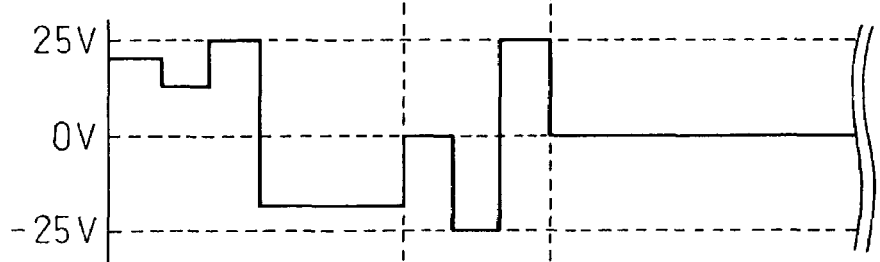

For the display data that displays the pixel in grayscale level 1 as shown in FIG. 7B, the signal voltage waveform shown in FIG. 8B is applied during the selection period to apply 0 V, 5 V, and −5 V in sequence. The composite voltage waveform of the scanning voltage and the signal voltage of FIG. 8B is as shown in FIG. 9B. The pixel forced into the black display state in the reset period is supplied with 0 V in the first phase of the selection period, −25 V in the second phase, and 25 V in the third phase. The threshold value of the segment "a" in the pixel of FIG. 7 (Vth1 in FIG. 6) is 25 V; in this case, since the voltage applied in the third phase of the selection period of the composite voltage waveform exceeds the positive threshold value of the ferroelectric liquid crystal in the segment "a", this segment is put in the first ferroelectric state. This state is retained during the non-selection period, producing a grayscale level 1 as shown in FIG. 7B.

Figure 7C:
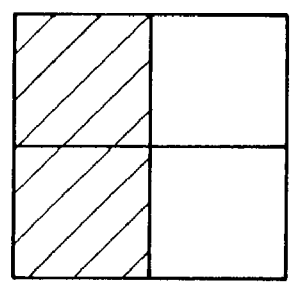
Figure 9C:
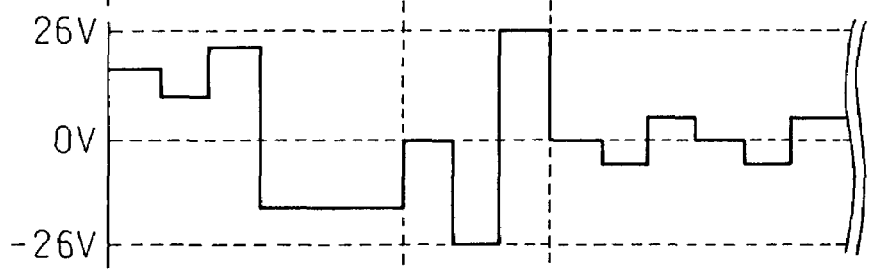

For the display data that displays the pixel in grayscale level 2 as shown in FIG. 7C, the signal voltage waveform shown in FIG. 8C is applied during the selection period to apply 0 V, 6 V, and −6 V in sequence. The composite voltage waveform of the scanning voltage and the signal voltage of FIG. 8C is as shown in FIG. 9C. The pixel forced into the black display state in the reset period is supplied with 0 V in the first phase of the selection period, −26 V in the second phase, and 26 V in the third phase. The threshold value of the segment "b" in the pixel of FIG. 7 (Vth2 in FIG. 6) is 26 V; in this case, as the voltage applied in the third phase of the selection period of the composite voltage waveform exceeds the positive threshold value of the ferroelectric liquid crystal in the segment "b" as well as the segment "a", these segments are put in the first ferroelectric state. This state is retained during the non-selection period, producing grayscale level 2 as shown in FIG. 7C.

Figure 7D:
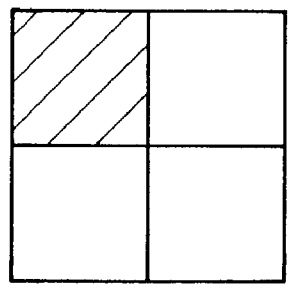
Figure 9D:
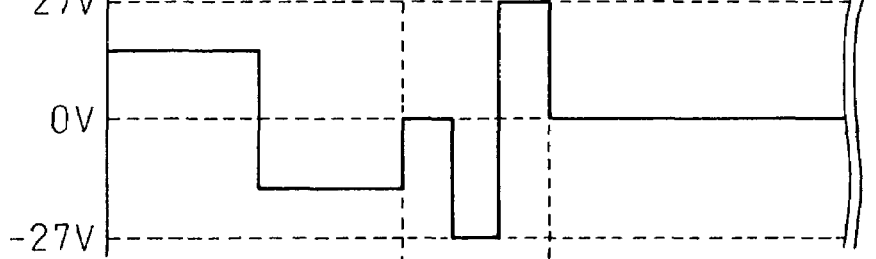

For the display data that displays the pixel in grayscale level 3 as shown in FIG. 7D, the signal voltage waveform shown in FIG. 8D is applied during the selection period to apply 0 V, 7 V, and −7 V in sequence. The composite voltage waveform of the scanning voltage and the signal voltage of FIG. 8D is as shown in FIG. 9D. The pixel forced into the black display state in the reset period is supplied with 0 V in the first phase of the selection period, −27 V in the second phase, and 27 V in the third phase. The threshold value of the segment "c" in the pixel of FIG. 7 (Vth3 in FIG. 6) is 27 V; in this case, since the voltage applied in the third phase of the selection period of the composite voltage waveform exceeds the positive threshold value of the ferroelectric liquid crystal in the segment "c" as well as the segments "a" and "b", these segments are put in the first ferroelectric state. This state is retained during the non-selection period, producing grayscale level 3 as shown in FIG. 7D.

Figure 7E:
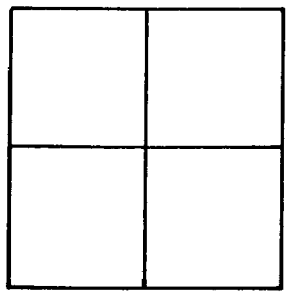
Figure 9E:
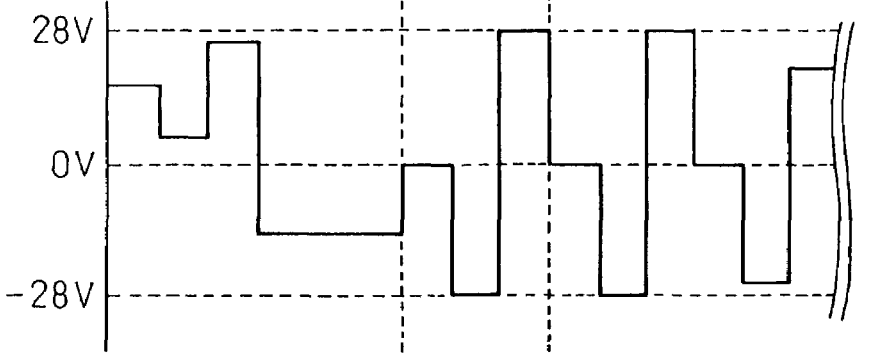

For the display data that displays the entire pixel in the white display state as shown in FIG. 7E, the signal voltage waveform shown in FIG. 8E is applied during the selection period to apply 0 V, 8 V, and −8 V in sequence. The composite voltage waveform of the scanning voltage and the signal voltage of FIG. 8E is as shown in FIG. 9E. The pixel forced into the black display state in the reset period is supplied with 0 V in the first phase of the selection period, −28 V in the second phase, and 28 V in the third phase. The threshold value of the segment "d" in the pixel of FIG. 7 (Vth4 in FIG. 6) is 28 V; in this case, since the voltage applied in the third phase of the selection period of the composite voltage waveform exceeds the positive threshold value of the ferroelectric liquid crystal in all of the segments "a", "b", "c", and "d", these segments are put in the first ferroelectric state. This state is retained during the non-selection period, displaying the entire pixel in the white display state as shown in FIG. 7E.

Summarizing the advantageous effects of the invention, explained above, there is provided a substrate for a liquid crystal panel having an alignment film, wherein an evaporated film is formed as the alignment film on the substrate, and wherein a portion of the evaporated film corresponding to each single pixel is split into a plurality of segments, and the evaporated film is formed with a different evaporation angle on each of the segments.

The evaporation angle θ which is different for each of the plurality of segments is set within a range of $$80° \leq \theta \leq 88°$$

with respect to a layer normal to the substrate. Further, the plurality of split segments have approximately equal areas.

The liquid crystal panel is a smectic liquid crystal panel constructed by confining a smectic liquid crystal therein. The smectic liquid crystal is a ferroelectric liquid crystal. The evaporated film is an $SiO_x$ film.

There is also provided a method for forming an alignment film for the above liquid crystal panel, wherein the substrate is placed above an evaporation source to be evaporated as the alignment film and, by masking the substrate while leaving a portion thereof exposed, evaporation is performed using a prescribed evaporation angle, the evaporation being performed a plurality of times, while exposing a different portion of the substrate and using a different evaporation angle each time, thereby forming a plurality of evaporated films with different evaporation angles.

In the alignment film formation method for the liquid crystal panel, the exposed portion of the substrate is one of a plurality of segments into which a portion of the substrate corresponding to each single pixel has been split.

In the alignment film formation method for the liquid crystal panel, the evaporation angle θ which is different for each of the plurality of evaporated films is set within a range of $$80° \leq \theta \leq 88°$$

with respect to the layer normal to the substrate. Further, the plurality of split segments have approximately equal areas.

In the alignment film formation method for the liquid crystal panel, the liquid crystal panel is a smectic liquid crystal panel constructed by confining a smectic liquid crystal therein. The smectic liquid crystal is a ferroelectric liquid crystal.

What is claimed is:

1. A liquid crystal panel comprising a liquid crystal sandwiched between a pair of substrates having electrodes deposited respectively on opposing surfaces thereof, the opposing surfaces of both of the substrates being split into a plurality of segments and an evaporated film formed on each of said segments of each substrate with a different evaporation angle and arranged as an alignment film, wherein the evaporated films are formed on the segments of both substrates in such a manner that evaporated films with the same evaporation angle face each other, a segment having a smaller evaporation angle of the evaporated film having a higher threshold voltage than a segment having a larger evaporation angle of the evaporated film and wherein the substrates are each provided with a driving voltage from a semiconductor circuit and an evaporated film having a smaller evaporation angle than the others is formed on a segment of each substrate located farther from the semiconductor circuit than the other segments on the substrate.

2. The liquid crystal panel of claim 1, wherein the evaporation angle θ is set within a range of $$80° \leq \theta \leq 88°$$

with respect to a layer normal to the substrate.

3. The liquid crystal panel of claim 1, wherein the plurality of split segments have approximately equal areas.

4. The liquid crystal panel of claim 1, wherein the liquid crystal panel is a smectic liquid crystal panel having a smectic liquid crystal thereon.

5. The liquid crystal panel of claim 4, wherein the smectic liquid crystal is a ferroelectric liquid crystal.

6. The liquid crystal panel of claim 1, wherein the evaporated film is an $Sio_x$ film.

7. The liquid crystal panel of claim 1, wherein the substrates are arranged facing each other in such a manner that the axes of the evaporated films formed on the segments of the substrates are oriented parallel to each other in the evaporation direction.

8. The liquid crystal panel of claim 1, wherein the liquid crystal panel is constituted such that it performs a grayscale display by varying the magnitude of the applied voltage to each of said segments and thereby the ratio of white display state segments to black display state segments is varied.

* * * * *